May 5, 1942.  F. E. MORGAN  2,281,985
EGG FORK AND OPENER
Filed Jan. 24, 1941
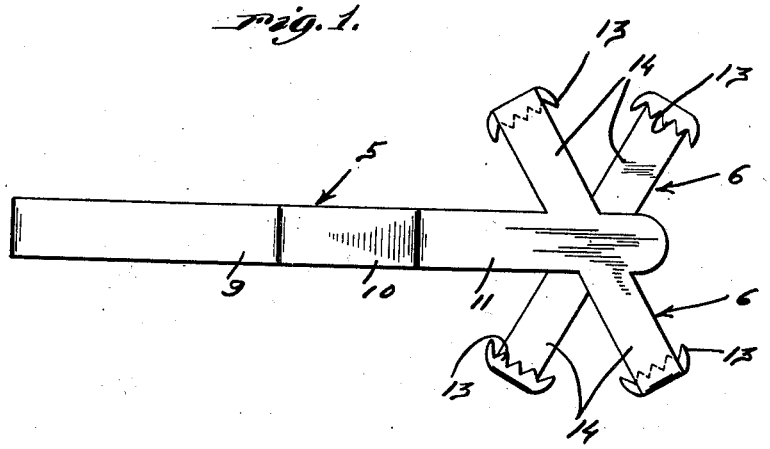
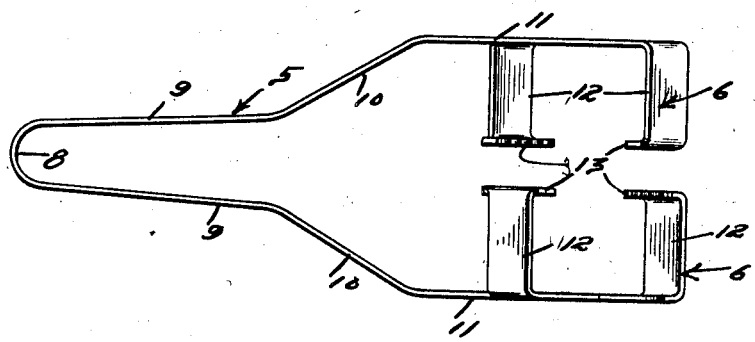
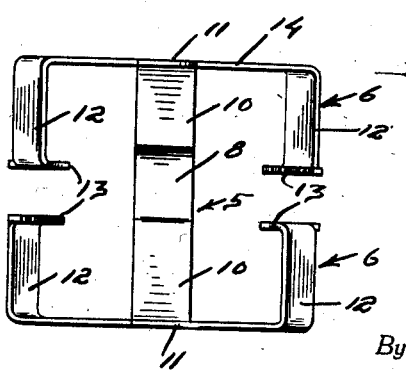
Inventor
Francis E. Morgan
By Clarence A. O'Brien
Attorney Patented May 5, 1942

2,281,985

UNITED STATES PATENT OFFICE 2,281,985

EGG FORK AND OPENER

Francis E. Morgan, Waco, Tex.

Application January 24, 1941, Serial No. 375,844

2 Claims. (Cl. 146—2)

This invention relates to an egg fork and opener, and has for the primary object the provision of a device of this character which is in the form of a hand tool especially constructed for gripping and holding an egg, in order that the egg may be safely lifted from boiling water and carried if desired, or held and at the same time the device may be used for cutting the shell into and for separating and holding the egg shell sections while the contents of each section is scraped or otherwise removed therefrom.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a top plan view illustrating an egg fork and opener constructed in accordance with my invention.

Figure 2 is a side elevation illustrating the device.

Figure 3 is an end elevation illustrating the device.

Referring in detail to the drawing, the numeral 5 indicates the handle of the tool and 6 jaws each of substantially U shape.

The handle 5 includes spring members connected, as shown at 8, and each include portions 9, 10 and 11. The portions 11 parallel each other and have the jaws 6 integrally formed therewith. The portions 10 are integral with the portions 11 and extend therefrom in converging relation and are formed integrally with the portions 9 which are in substantial parallelism and are arranged closer to each other than the portions 11. The portions 9 act as a hand grip for the handle and may be squeezed to contract the portions 11 for moving the jaws in the direction of each other.

Each jaw is constructed of resilient material and capable of flexing for the purpose of passing over an end of an egg. The free ends of the jaws are angularly related to the arm portions 12 and disposed oppositely to each other. The ends are arcuately curved and serrated, as shown at 13, so as to readily grip the shell of an egg. The jaws 6 further include bight portions 14 which are integral with the portions 11 of the handle 5. The jaws are arranged in X formation and oppose each other, so that said jaws may be applied over the ends of an egg. The portions 9 of the handle 5 are gripped or squeezed in the hand which moves the serrated ends of the jaws toward the medial portion of the egg. The jaws when moving toward the medial portion of the egg are caused to flex by their contact with the egg thereby flexing the arm portions of the jaws so that the serrated ends thereof will tightly grip the medial portion of the shell of the egg.

The tool thus applied to the egg, then may be employed for safely lifting and carrying or holding the egg. By striking the arm portions of the jaws with a spoon or some other utensil, the serrated ends of the arm portions of said jaws will cut through the shell into the white of the egg. The grip on the portions 9 of the handle 5 is then slightly released, allowing the portions 11 of the handle to move apart, carrying the jaws therewith which brings about separation of the egg shell at its medial portion with the egg shell sections gripped by the jaws. The contents of the egg sections may then be readily removed through the use of a knife or some other utensil.

The tool described will permit a person to readily and safely remove an egg which has been cooked in boiling water and to hold the egg and carry the egg to any place desired and further to bring about the separation of the egg shell at its medial portion with the sections of the egg shell firmly gripped and held apart so as to expose the contents for removal.

While I have shown and described the preferred embodiment of my invention, it will be understood that minor changes in construction, combination and arrangement of parts may be made without departing from the spirit and scope of the invention as claimed.

Having thus described the invention, what I claim is:

1. In a hand tool of the character described, a handle including resilient members having substantially parallel relation and capable of being squeezed in the direction of each other, and substantially U-shaped resilient jaws formed on said members and arranged in diagonally opposed relation to receive and grip an egg, each jaw terminating in angularly related serrated gripping ends.

2. In a hand tool of the character described, a handle including resilient members having substantially parallel relation and capable of being squeezed in the direction of each other, and substantially U-shaped resilient jaws formed on said members and each including a connecting portion and parallel arm portions terminating in angularly related serrated gripping ends, said connecting portion of the jaws being integrally formed with the members of the handle and extending across each other in X formation, said members of the handle being normally spaced to permit an egg to be received within the jaw portions with the ends of the egg disposed next to the members of the handle with the serrated ends gripping the medial portion of the egg whereby the arm portions of the jaws may be tapped to cause penetration of the serrated ends of the jaws into the shell of the egg for the separation of the shell of the egg in sections gripped by said jaws when the members of said handle are permitted to return to their normal positions.

FRANCIS E. MORGAN.